United States Patent Office

2,874,088
Patented Feb. 17, 1959

---

2,874,088

RECOVERY OF KALLIKREIN

Fritz Schultz, Wuppertal-Sonnborn, Germany, assignor to Farbenfabriken Bayer Aktiengesellschaft, Bayerwerk, Germany, a German corporation No Drawing. Application August 18, 1953
Serial No. 375,062

Claims priority, application Germany August 25, 1952

8 Claims. (Cl. 167—74)

This invention relates to improvements in the recovery of kallikrein.

One object of the invention is the recovery of the circulatory hormone kallikrein from urine and thermolysates or autolysates of pancreas. This and still further objects will become apparent from the following description:

It has now been found that kallikrein may be precipitated from urine or thermolysates (see U. S. patent application Serial No. 304,225, now Patent No. 2,784,142) or autolysates of pancreas by the addition of an aqueous solution of a lead or zinc salt. The precipitate formed is a water insoluble adsorbate which may be separated from the major portion of the biologically inactive accompanying substances in the starting material. The kallikrein may then be liberated from the water insoluble adsorbates by elution.

The hormone products thus obtained have a high degree of purity and may, after dialysis, be used as by injection for therapeutic purposes without further purification. The yields obtained, in accordance with the invention, amount up to 100%.

If desired, the solutions obtained, in accordance with this invention, can be further purified in accordance with conventionally known methods. Thus, for example, stable dry products may be obtained from the solution after dialysis by precipitation with organic solvents such as acetone, alcohol or mixtures of such organic solvents.

The precipitation of the aqueous lead or zinc salt solutions with the adsorption of the active kallikrein is a very specific and entirely unexpected reaction. This precipitation and thus adsorption does not occur with salts of magnesium, calcium, strontium, barium, cadmium, mercury, copper, bivalent iron, trivalent iron or manganese, and thus, it could never be expected to occur with the water soluble lead or zinc salts in the form of their aqueous solutions.

The occurrence of the precipitation, in accordance with the invention, is to a high degree independent of the hydrogen ion concentration. Thus, for example, effecting the precipitation with an aqueous lead salt solution and after elution with a secondary ammonium phosphate solution, the same kallikrein starting material will yield 22,800 units of kallikrein if precipitated at a pH of 4.2, and 18,600 units if precipitated at a pH of 7.0.

The yield in purity of the product obtained substantially depends upon the selection of the eluant. Good results are obtained, for example, with phosphate buffer solutions, soda, bicarbonate or dilute ammonia. Other eluants known in fermentation chemistry may also be successfully used.

The process, in accordance with the invention, has considerable advantages over the previously known methods for kallikrein purification. The execution of the new process is extremely simple and a product of a high degree of purity is obtained. The purification effect of kallikrein extracted from urine, in accordance with the invention, is 100 fold and that from pancreatic thermolysates is 80 to 90 fold. The yield obtained varies between 60 and 100%. The kallikrein initially obtained in a highly dilute condition may be concentrated, in accordance with the invention, to a small volume without the necessity of vacuum distillation. The process is well adapted for the recovery of kallikrein from urine and the pancreas and obviates the need for the use of expensive and difficulty obtainable uranyl acetate as a precipitant.

Though certain attempts have been made prior to the present invention to utilize lead and zinc salts for purifying kallikrein, these attempts were not marked by success and are differentiated from the process in accordance with the invention.

Attempts were made to adsorb kallikrein from urine by the addition of preformed suspensions of zinc hydroxide at a pH of between 7.4 and 9.2 (see F. Bischoff and A. J. Elliot (Journ. of Biol. Chem. 109, 423 (1935))). Though the attempts to adsorb the kallikrein were repeated up to four times in succession, kallikrein, as a rule, was not adsorbed by the zinc hydroxide. As it was set forth, "the products obtained are generally unstable," whereas in contrast to this, the solutions prepared in accordance with the invention, remain stable upon storage for weeks. A fundamental difference in the Elliot process and the process in accordance with the invention, resides in the fact that Elliot adsorbs accompanying substances or active substances with the zinc hydroxide suspension, whereas, in accordance with the invention, such a suspension is not used, but a zinc-protein precipitate is formed in situ in the kallikrein solution by the addition of the soluble dissolved zinc salts, which precipitate on formation adsorbs the active kallikrein ingredient.

It was also attempted to produce precipitates of lead phosphate solutions of urinary kallikrein in order to adsorb the kallikrein or its accompanying substances, see for example, H. Kraut, E. K. Frey, E. Bauer and F. Schultz (Zeitschr. physiol. Chem. 205, 99 (1932)). This process, however, involved complicated operations (see page 106 of the above publication) which could not be adapted in any practical manner for production. As opposed to this, the process in accordance with the invention does not adsorb the active kallikrein ingredient to a lead phosphate, but precipitates a lead protein precipitate using an aqueous lead salt solution and liberates the adsorbed kallikrein from the precipitate by means of an eluant such as a phosphate solution.

The following examples are given to illustrate the invention and not to limit the same:

*Example 1*

Twenty-five liters of fresh human urine of the pH 6.5 are precipitated with 4 liters of lead acetate solution (10%). The precipitate is separated and washed with 3 liters of distilled water. The precipitate is then mixed with stirring with 1.3 liters of water and 1.3 liters of a diammonium phosphate solution (10%) are slowly introduced with continuous stirring. The pH is 7.2. After ½ hour stirring, the precipitate is removed by centrifuging and the solution dialysed against running water for 48 hours. The yield amounts to 5000 units=100%, the degree of purity is 900γ per unit.

*Example 2*

Ninety liters of a pancreatic thermolysate (obtained according to the process of application Serial No. 304,225) containing 900,000 kallikrein units are precipitated with 12.6 liters of a lead acetate solution (10%) with stirring. The precipitate is filtered with suction, washed with 5 liters of water and recovered. The residue is mixed with 3 liters of distilled water and 2.5 liters of a diammonium phosphate solution (16%) are introduced with further stirring. After 1 hour, the precipitate is removed by centrifuging and the remaining clear solution is dialysed against flowing water for 72 hours. The yield amounts to 720,000 units with a degree of purity of 60γ per unit.

The dialysate thus obtained is concentrated in vacuo at 45° C. to one liter, the precipitated residue is suction filtered and the solution precipitated with 5 liters of a mixture of alcohol and acetone (50/50%) at +3° C. The precipitate is removed by centrifuging, mixed with ½ liter of acetone and filtered on a suction filter. The filtrate is washed with acetone, thereafter with ether and the crumbly residue is dried in the air for some hours, finally in the evacuated $P_2O_5$ exsiccator. The yield is 23.22 grams, or 540,000 units which amounts to 75%. The purity is 43γ per unit.

*Example 3*

Seven hundred and eighty cc. of pancreatic thermolysate containing 7300 units are precipitated with 200 cc. of a zinc acetate solution (10%), the precipitate is separated by centrifuging and washed with 100 cc. of distilled water. After removing the wash water, the residue is mixed while stirring with 100 cc. of distilled water and 55 cc. of a sodium bicarbonate solution (10%) are introduced into the suspension in drops with stirring. After 1 hour, the insoluble residue is separated, the solution neutralized and dialysed against running water for 48 hours.

Yield: 5100 units; purity: 1 unit=43γ.

*Example 4*

One liter of a pancreatic autolysate obtained by autolysis at 37° C. for 72 hours, which contains 20,000 kallikrein units is precipitated with 10 cc. of a zinc acetate solution (10%). The precipitate is separated by centrifuging, washed with 100 cc. of distilled water and mixed with stirring with 60 cc. of water after repeated centrifuging. Thereupon, 20 cc. of a diammonium phosphate solution (10%) are run in and the insoluble part is separated after 1 hour's stirring. The solution containing the kallikrein is neutralized and dialysed against running water for 40 hours.

Yield: 12,300 units; purity: 1 unit=70γ.

*Example 5*

Example 2 was repeated using lead nitrate in the place of the lead acetate. The yield of kallikrein obtained is identical.

The precipitation in accordance with the invention should be effected at a pH between 4 and 7 and preferably at a pH of about 5. The process becomes inoperative in an alkaline solution and kallikrein is inactivitated at a pH below 4.

The amount of the water soluble lead or zinc salt in accordance with the invention and the concentration of the salt is dependent upon the starting thermolysate or autolysate. The concentration is only limited by the solubility of the salt and by the fact that undue dilution should be avoided.

The starting kallikrein containing material may, for example, be material as is described on pages 70 to 71 and 84 to 89 inclusive of the monograph by Frey, Kraut and Werle, "Kallikrein (Padutin)," Stuttgart 1950.

I claim:

1. In the method for the recovery of kallikrein from a member selected from the group consisting of urine, thermolysates and autolysates of pancreas, the improvement which comprises adding an aqueous solution of a water soluble salt of a metal selected from the group consisting of lead and zinc to said first mentioned group member to thereby precipitate an adsorbate at a pH of about 4 to 7 and separating kallikrein from said adsorbate.

2. Improvement according to claim 1 in which said kallikrein is separated from said adsorbate by elution.

3. Improvement according to claim 2 in which said elution is effected with an eluant selected from the group consisting of diammonium phosphate buffer solutions, soda, sodium bicarbonate and dilute ammonia.

4. Improvement according to claim 3 in which said eluant is a di-ammonium phosphate solution.

5. Improvement according to claim 1 in which kallikrein is liberated from said adsorbate by elution, subjected to dialysis and recovered.

6. Improvement according to claim 5 in which said elution is effected with a diammonium phosphate buffer solution.

7. Improvement according to claim 1 in which the kallikrein is separated from said adsorbate by elution subjected to dialysis and precipitated with an organic solvent selected from the group consisting of acetone, alcohol, and mixtures thereof.

8. Improvement according to claim 1 in which said adsorbate is precipitated at a pH of about 5.

References Cited in the file of this patent

UNITED STATES PATENTS 2,174,862    Sahyun _____ Oct. 3, 1939

FOREIGN PATENTS 59,267    Denmark _____ Dec. 1941

OTHER REFERENCES

Kraut: Zeit. fur Physiologische Chemie, vol. 205, 1932, pp. 99–114 (pp. 99, 105–109 pert.).

Somogyi: J. Biol. Chem., vol. 86, April 1930, pp. 655–663 (p. 657 pert.).

Sahyun: Am. J. of Physiology, vol. 125, No. 1, January 1939, pp. 24–30 (p. 26 pert.).

Bischoff et al.: J. Biol. Chem., vol. 109, April–May 1935, pp. 419–427 (pp. 419, 420, 423 and 425 pert.).